United States Patent [19]
Klim

[11] Patent Number: 5,740,094
[45] Date of Patent: Apr. 14, 1998

[54] SELF-TIMED MULTIPLIER ARRAY

[75] Inventor: Peter Juergen Klim, Austin, Tex.

[73] Assignee: International Business Machines Corporation, Armonk, N.Y.

[21] Appl. No.: 515,335

[22] Filed: Aug. 21, 1995

[51] Int. Cl.⁶ .................................................. G06F 7/52
[52] U.S. Cl. ............................................................. 364/754
[58] Field of Search ...................... 364/716, 736, 364/754, 757, 760; 395/800

[56] References Cited

U.S. PATENT DOCUMENTS

| | | |
|---|---|---|
| 4,567,386 | 1/1986 | Benschop . |
| 4,577,190 | 3/1986 | Law . |
| 4,638,462 | 1/1987 | Rajeevakumar et al. . |
| 4,899,066 | 2/1990 | Aikawa et al. . |
| 5,003,501 | 3/1991 | Podkowa . |
| 5,093,809 | 3/1992 | Schmitt-Landsiedel . |
| 5,150,325 | 9/1992 | Yanagisawa et al. . |
| 5,204,841 | 4/1993 | Chappell et al. . |
| 5,289,403 | 2/1994 | Yetter . |
| 5,345,472 | 9/1994 | Podkowa . |

*Primary Examiner*—Tan V. Mai
*Attorney, Agent, or Firm*—Kelly K. Kordzik; Winstead Sechrest & Minick P.C.; Anthony V. S. England

[57] ABSTRACT

Logic circuitry implemented in a pipeline manner receives a request signal along with received data into the pipeline and proceeds to insure that each successive stage within the pipeline is placed into a standby state and out of a precharge state previous to the arrival of the data wave into each of the successive stages. The circuitry also resets each of the stages after a stage has evaluated the data. The logic circuitry may be employed within a multiplier array in a processor.

9 Claims, 14 Drawing Sheets

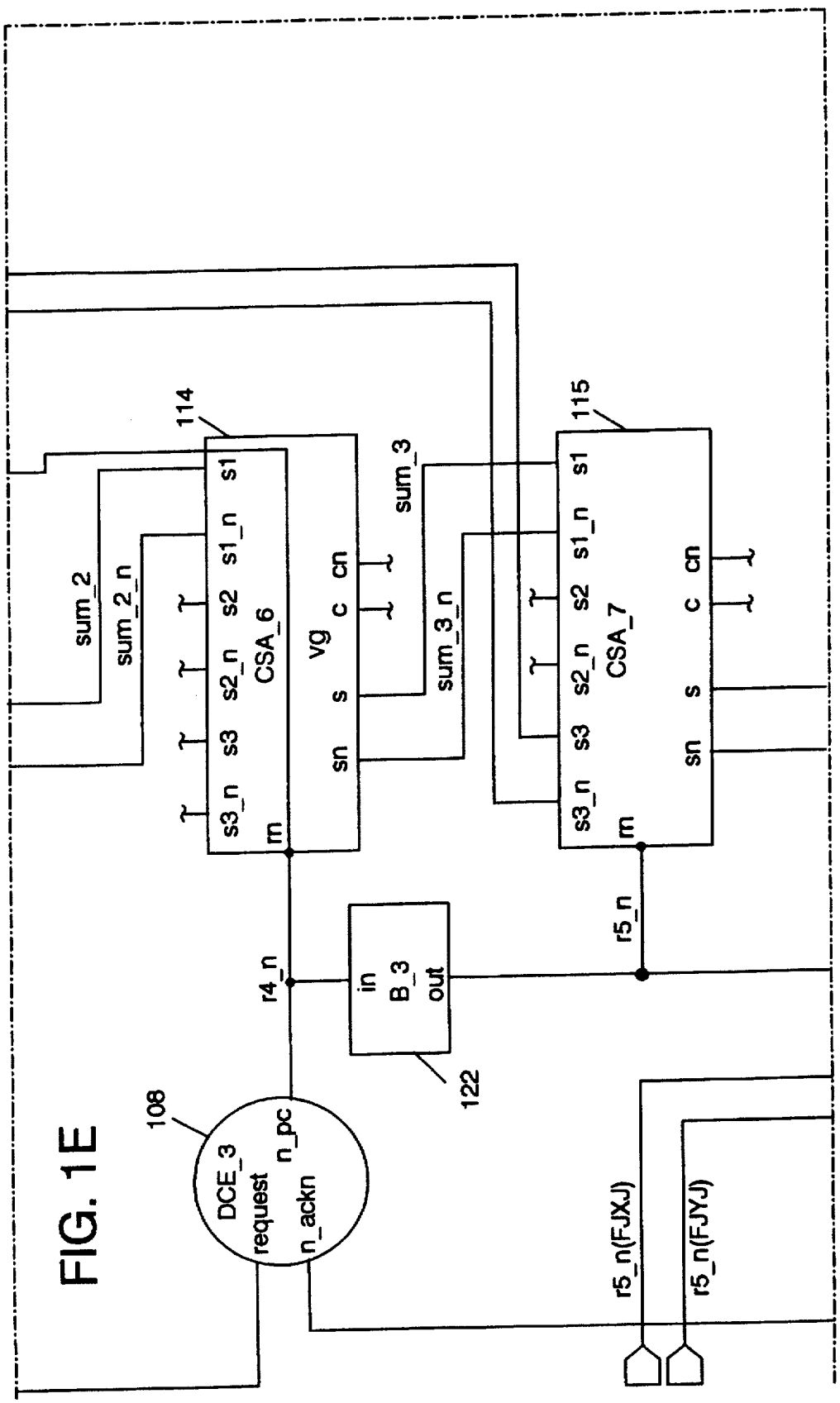

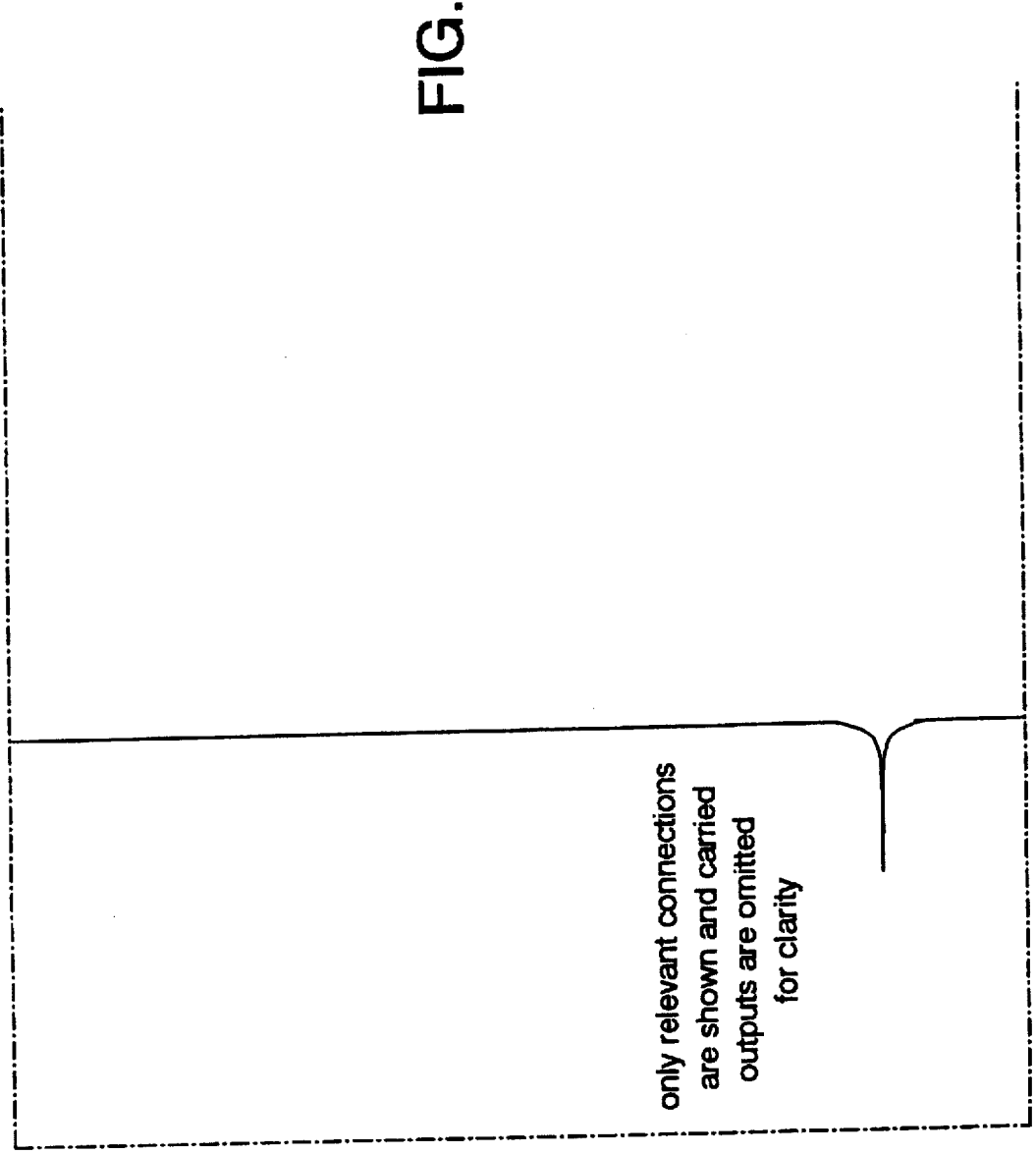

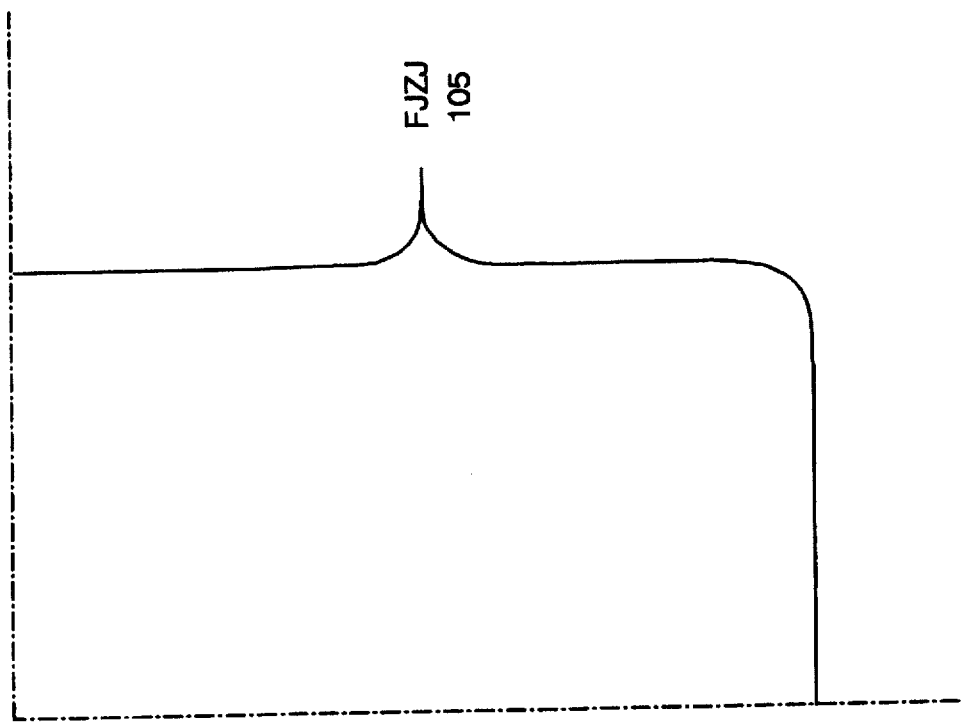

SELF-TIMED MULTIPLIER ARRAY

TECHNICAL FIELD OF THE INVENTION

The present invention relates in general to data processing systems, and in particular, to a circuit for providing self-timing of precharge and reset signals within a pipeline of logic circuits.

BACKGROUND OF THE INVENTION

The current circuit method of choice in high performance computing systems is dynamic CMOS (complimentary metal-oxide semiconductor). (For a background discussion of dynamic logic circuitry, please refer to U.S. Pat. No. 5,550,490 and U.S. application Ser. No. 08/461,961, which are hereby incorporated by reference herein.) This implies that precharge signals must be issued to all dynamic nodes. Typically, several thousand precharge signals must be distributed throughout a processor chip, which incorporates dynamic logic circuitry. Existing art tends to utilize the system clock for precharge generation putting unnecessary burden on the clock distribution system with respect to loading and wiring. Furthermore, two or more phases of clocks must be developed in order to ensure proper reset operation. The clock phases must be very well controlled to ensure coherent data pipelining, which puts an additional burden on tuning and routing particularly in a large floating point multiplier array because of its size of several millimeters in height and width.

Another problem with existing dynamic logic circuitry is that each stage of a pipeline of logic circuitry is "held up" waiting for that stage to be placed out of a precharge state. Typically, the placing of a stage within a pipeline of logic circuitry into a ready state (not a precharge state) is dependent upon the receipt of data outputted from the pipeline stage immediately preceding the present stage. In other words, before a particular stage is placed in a state ready to receive data so as to perform a logic function on that data, the inputted data from the previous stage must be sampled in order to produce a signal delivered to the waiting stage to take the waiting stage out of precharge. As a result, the evaluation of inputted data at a particular stage in a pipeline of logic circuitry is delayed for a period of time required for the inputted data to be sampled and evaluated in order to produce the signal needed to take the particular stage out of precharge.

Therefore, what is needed in the art is a dynamic logic circuit design where the reset is decoupled from the clock thus eliminating all apparent disadvantages and provides robustness to the design that is absent in clocked reset approaches. What is also needed in the art is a dynamic logic circuit design that is more efficient at cascading data through several stages of pipelined logic circuitry.

SUMMARY OF THE INVENTION

The foregoing needs are satisfied by the present invention, which implements circuitry within a pipeline of stages of logic circuitry so that successive stages within the pipeline are placed in a standby state and out of a precharge mode before the data wave proceeds through the pipeline. This is accomplished by monitoring the input of data into the pipeline, such as by receiving a request signal from a preceding macro of logic circuitry and using this request signal to signal the various stages of the pipeline to enter into the standby state before data is presented to the input of a particular stage for evaluation. This may encompass placing a stage into the standby state before the previous stage in the pipeline has evaluated the data being propagated through the pipeline. Implementation of this technique is performed with logic circuitry and buffers to provide the correct timing of the signals to the stages.

After a particular stage has evaluated data and sent it to the next stage in the pipeline, that stage is reset using a feedback signal from subsequent stages.

The present invention may be implemented within any logic circuitry within a data processing system. For example, such an implementation of the present invention may be used in a floating point multiplier within a central processing unit in a data processing system.

An advantage of the present invention is that it allows for a pipeline of logic circuitry implemented with the present invention to be coupled to logic circuitry that is self-resetting. Furthermore, the present invention does not require the use of a clock signal to time the placement of the various stages in the standby and precharge states. Thus, the present invention may implement a pipeline of logic circuitry in an asynchronous manner.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1A:
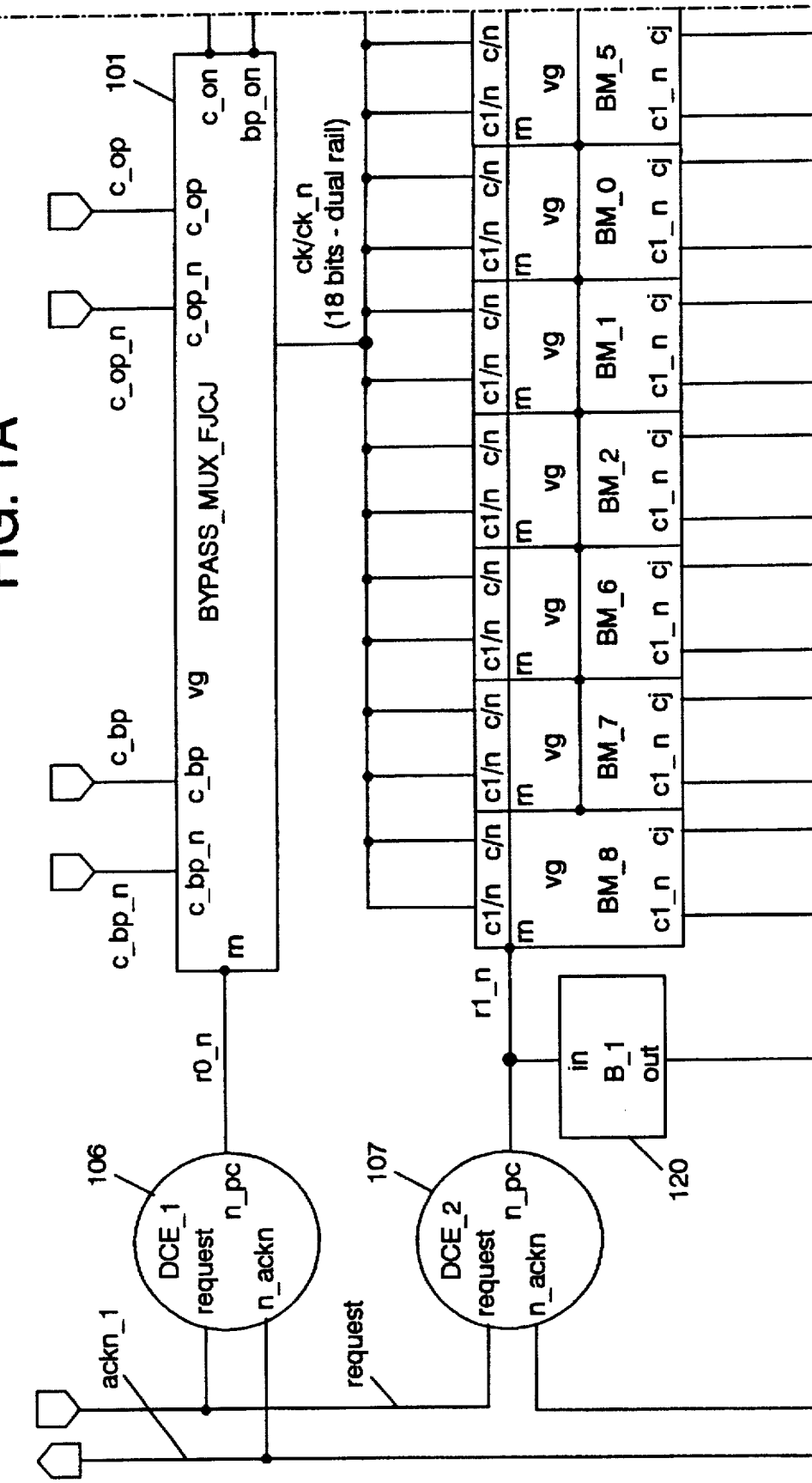
FIG. 1, shown as FIGS. 1A–1J, illustrates a portion of a multiplier array configured in accordance with respect to the present invention.
Figure 1B:
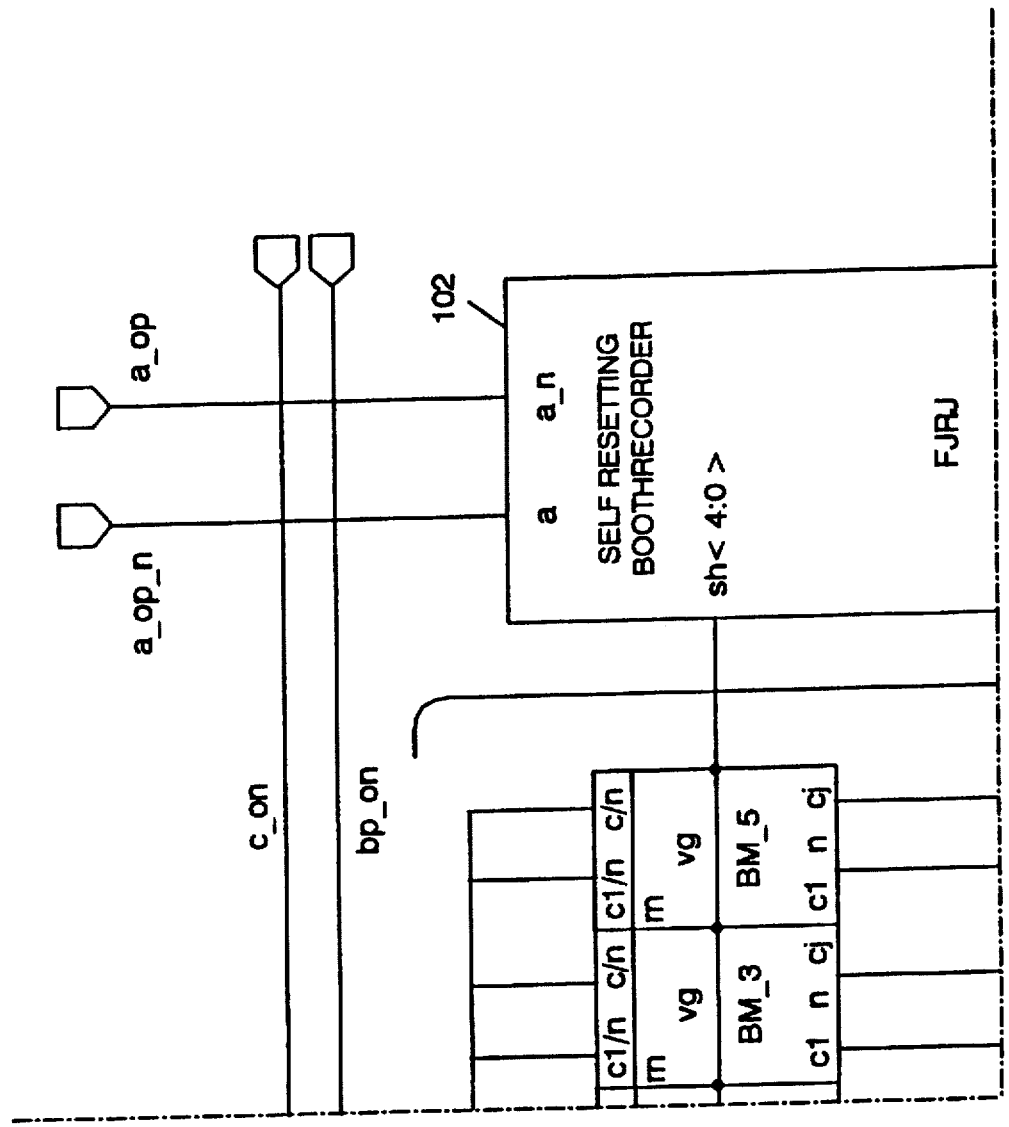
Figure 1C:
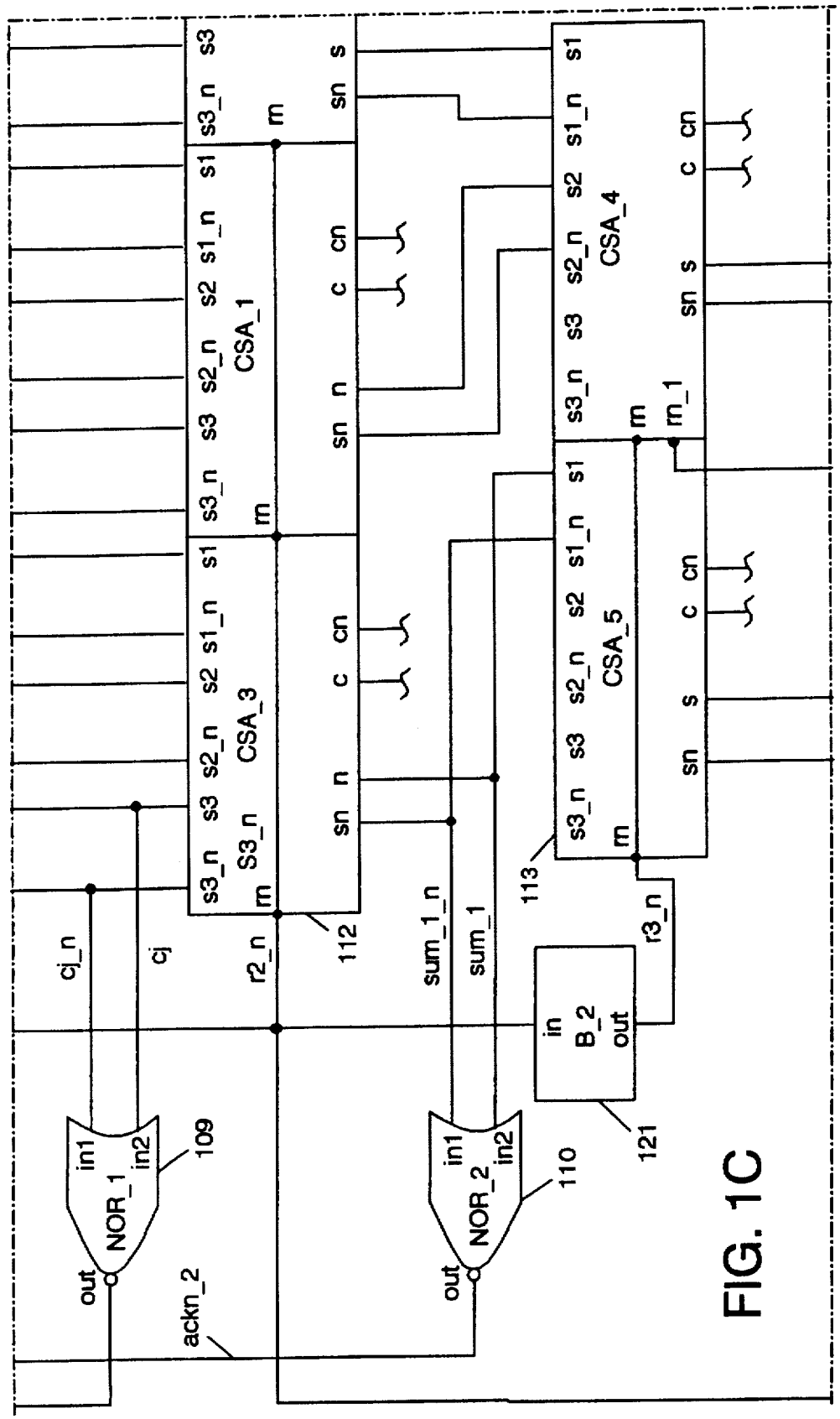
Figure 1D:
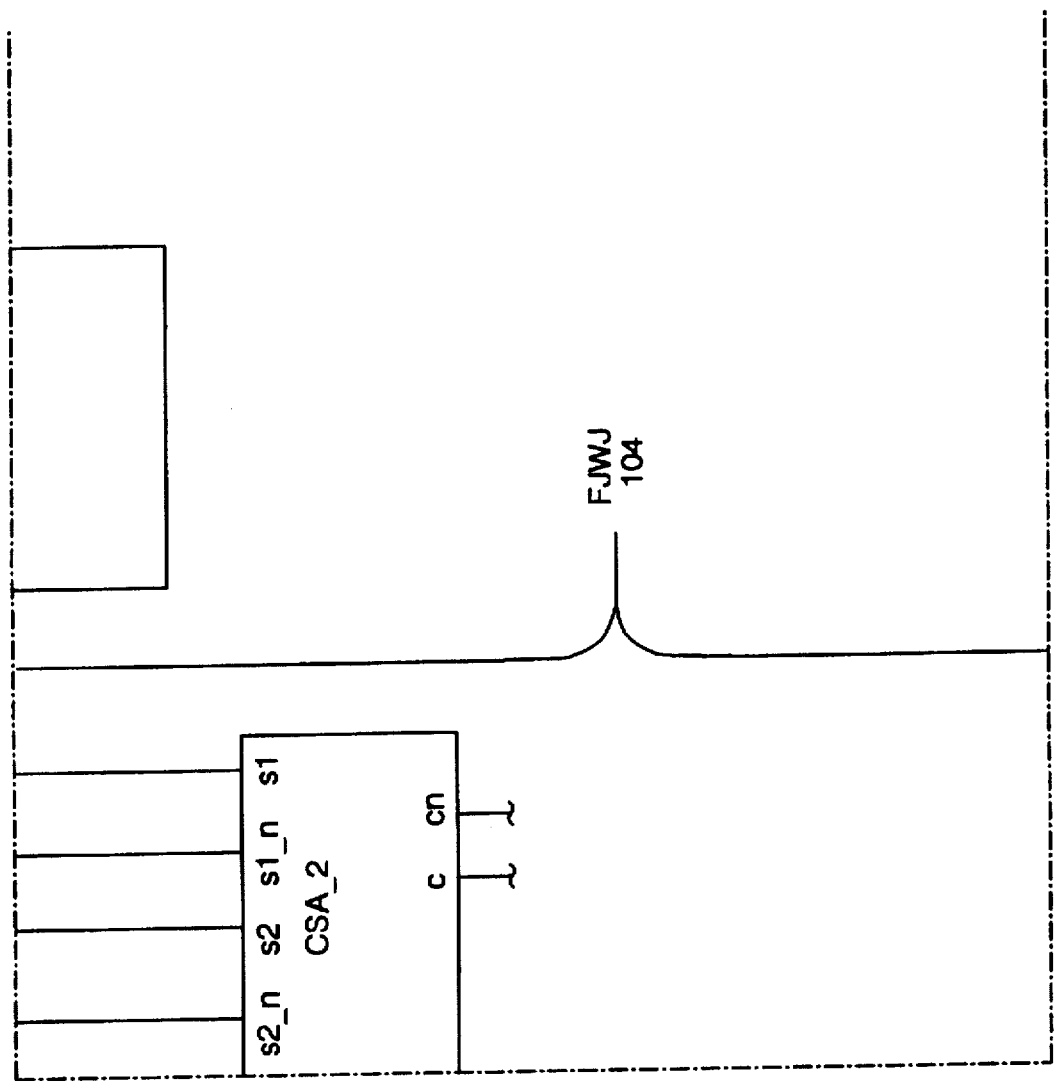
Figure 1G:
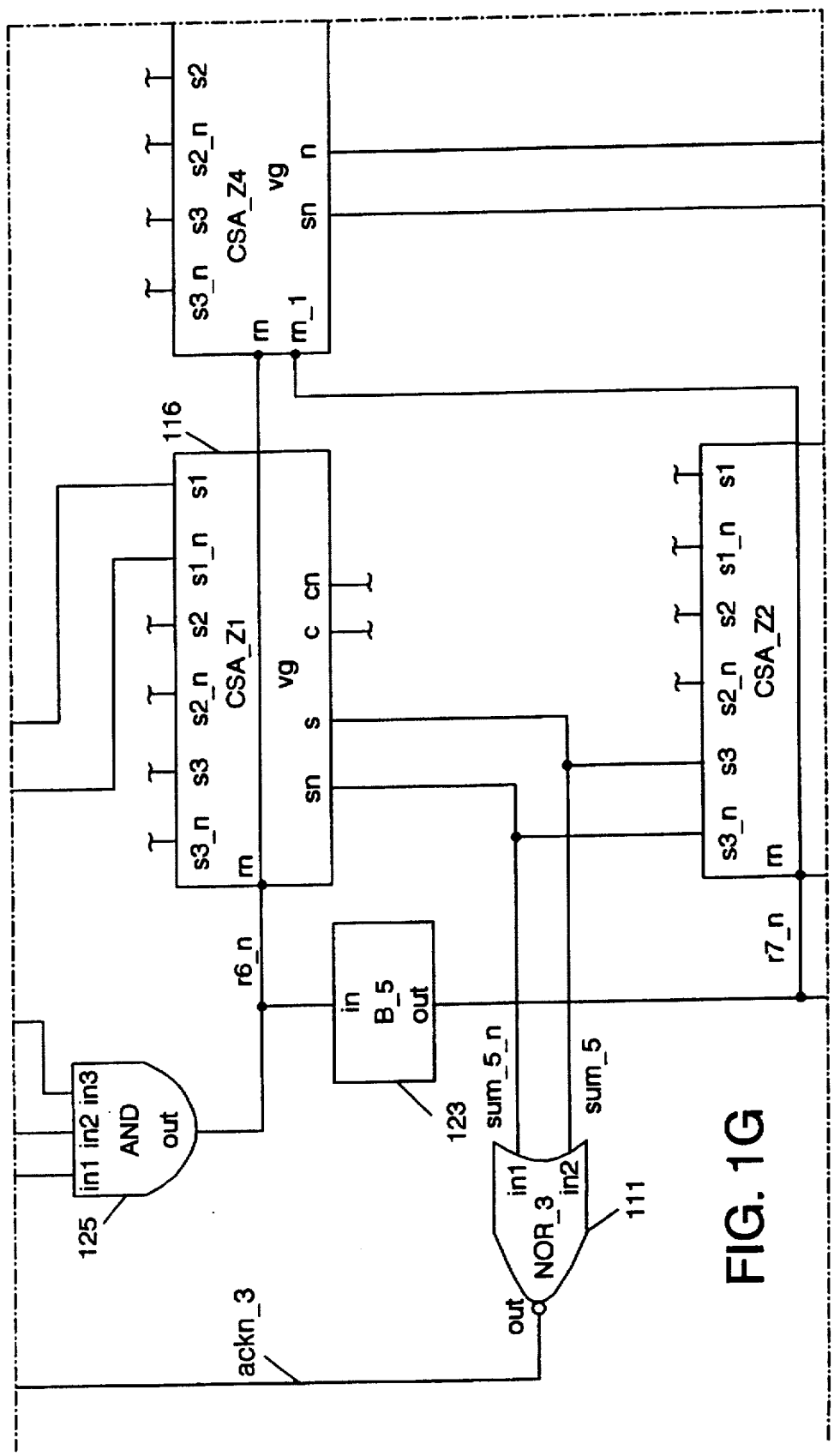
Figure 1H:
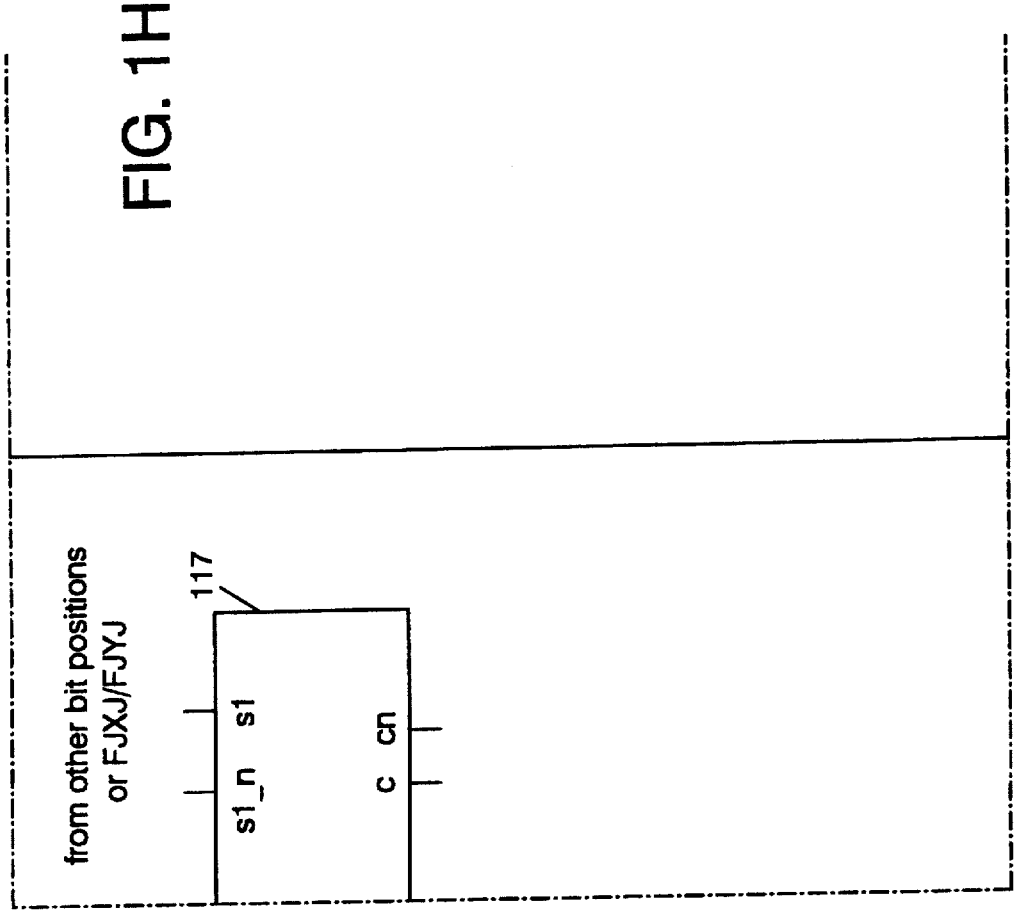
Figure 11:
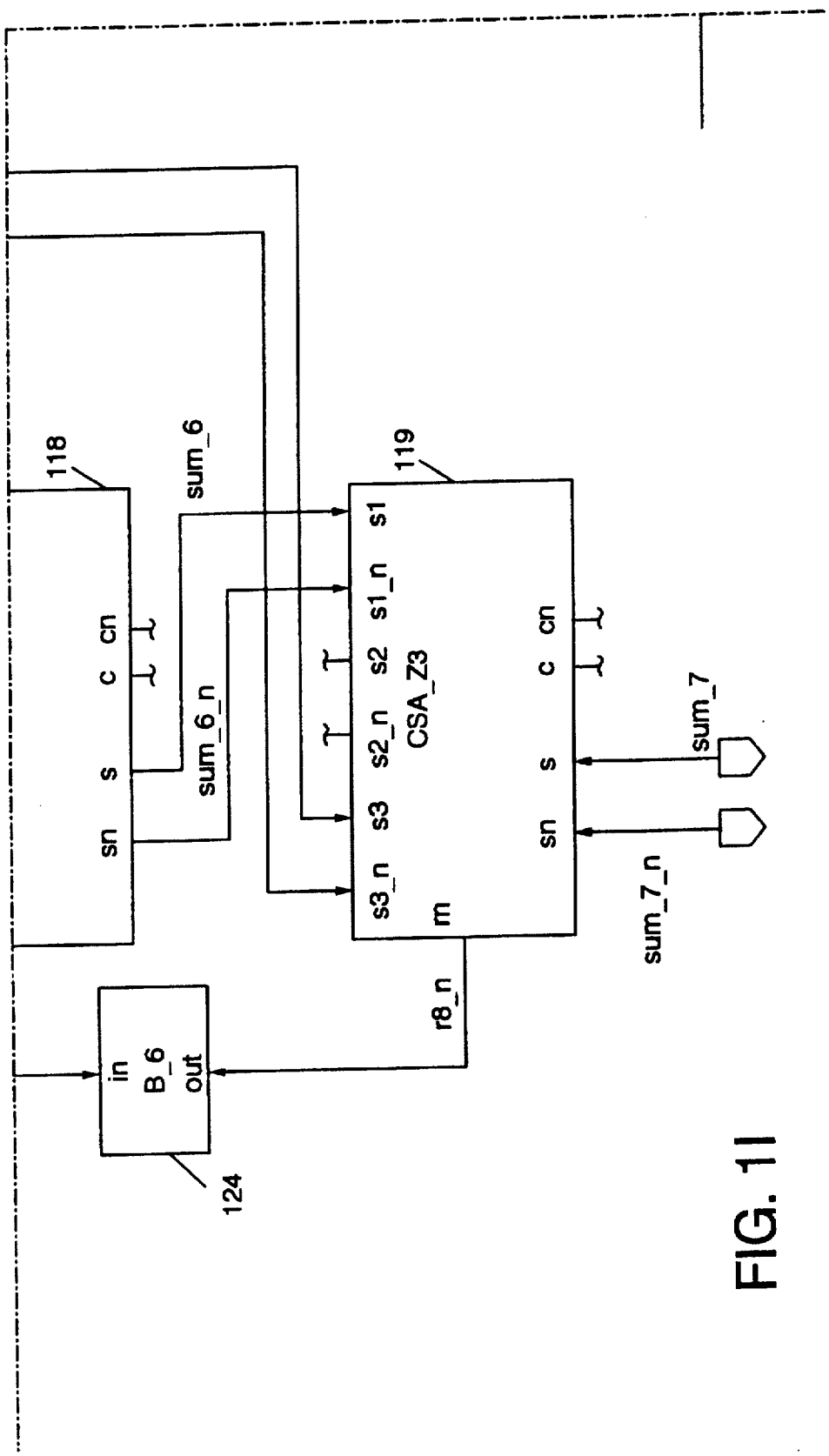

In the following description, numerous specific details are set forth such as timing, specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Referring to FIG. 1, there is illustrated a portion of a multiplier array, which may be located within a floating point multiplier within a central processing unit ("CPU") in a data processing system. The present invention will be described with respect to the passing of data through the various stages of the multiplier array. However, the present invention may be implemented within any pipeline of logic circuitry utilized within a data processing system where data is evaluated at various cascaded stages of logic circuitry.

Furthermore, the multiplier array is implemented in a dual-rail circuit design, which is well-known in the art. Thus, each data signal within the multiplier array is accompanied by a complement signal. Except for signals designated as rx__n (wherein x=0 . . . 8), these complement signals are generally designated within FIG. 1 by placing the letter "__n" after a label that is the same as the complement of the inverse signal. Thus, the c__operand data signal is designated as c__op, while its dual-rail complement is designated as c__op__n.

A c__operand data signal is received (not shown) from op-latches and the bypass data c__bp from a binary shifter (not shown) is received by bypass-mux 101. Two control lines bp__on and c__on determine if the bypass data or the c__operand is passed to the multiplier array, respectively. Bypass-mux 101 is the first stage of the self-timed pipeline shown in FIG. 1. A__operand data is received by booth-recorder 102. Booth-recorder 102, which may be any well-known booth-recorder, is also the first logic stage, but is employing a self-resetting method, such as those disclosed in the above-referenced United States patent applications. Booth-recorder 102 contains 3 groups of 9 booth-recoder circuits, each of which drive 5 control lines to booth-muxes 103 contained in three parallel 9to2 compressor arrays, only one of which is illustrated and designated with the label 104. The three compressor arrays are essentially identical and may disclose well-known circuitry (architectural details are beyond the scope of this disclosure). The 9to2 compressors operate in parallel, each of them generating two partial products for a total of six. Each of the three 9to2 compressor arrays receives 9 sets of 5 control signals from its corresponding booth-recorder 102. Each control line is connected to 53 booth-muxes (1 in each bit position) in the corresponding compressor arrays. Five control lines couple booth recorder 102 to booth-muxes 103. Each output of bypass-mux 101 is fed to the data inputs of booth-muxes 103 in each 9to2 compressor.

In addition to booth-muxes 103, each bit position in array 104 contains a 9to2 compressor consisting of 7 Carry Save Adders (CSA), designated as CSA__1 . . . CSA__7. 9to2 compressor array 104 generates two partial products, which are connected to 6to2 compressor 105 which reduces the 6 partial products to 2, which is the output of the multiplier array. 6to2 compressor 105 is also constructed with CSAs, which are dynamic dual-rail circuits.

The control lines for booth-muxes 103 are generated by booth-recorder 102. The most optimum reset scheme suggests booth-recorder 102 to be self-resetting, thus treating it as a single independent stage. The reset latency of booth-recorder 102 is designed such that it occurs at the end of the cycle guaranteeing that the evaluation of booth-mux 103 has been completed. This has the advantage that the three high booth-recorder 102 does not require a virtual ground ("vg") device. A virtual ground device is a type of foot device that allows for incoming data to a dynamic logic circuit to be active before removing the reset signal and allows data to remain active to the inputs of the dynamic logic circuit after reset initiates. Such devices are well-known in the art.

Bypass-mux 103 nevertheless uses a virtual ground device since it interfaces with clocked latches and generates its reset independently of the clock based on evaluation of a logic circuit in the pipeline rather than its own delay as employed in booth-recoder 102. The compromise is minimized though since bypass-mux 101 has a stack of two n-FETs not counting the virtual ground ("vg") device. For robustness reasons it was chosen to also add a virtual ground device to booth-mux 103 because of the large distances between macros driving booth-mux 103. Again, booth-mux 103 consists of a stack of two n-devices not counting the vg device, thus minimizing the area/delay penalty.

A vg device is also placed at the second to last stage of 9to2 compressor 104. This is an optimum point for the final vg device, because this stage only drives the adjacent final stage, and thus has a fairly weak pull down tree minimizing the delay/area penalty for the vg device.

The self-timed chain of the present invention could be discussed with respect to the complete data flow of a floating point unit, making it totally asynchronous of the clock. However, for the purpose of the disclosure it is sufficient to show the handshake mechanism of the present invention up to this point.

The self-timed technique of the present invention is shown and discussed with respect to the portion of the multiplier illustrated in FIG. 1. The actual data connections are used for clarity only and a single bit position of array 104 is shown to explain the handshake operation. Dynamic Control Elements (DCE) DCE__1 106, DCE__2 107 and DCE__3 108 and NOR gates NOR__1 109, NOR__2 110, and NOR__3 111 are used to facilitate the handshake operation. A truth table for each DCE circuit may be as follows:

TABLE 1

| request | n__ackn | n__pc |
|---------|---------|-------|
| 1 | 1 | 1 |
| 0 | 1 | Qn − 1 |
| 1 | 0 | 0 |
| 0 | 0 | 0 |

Figure 2:
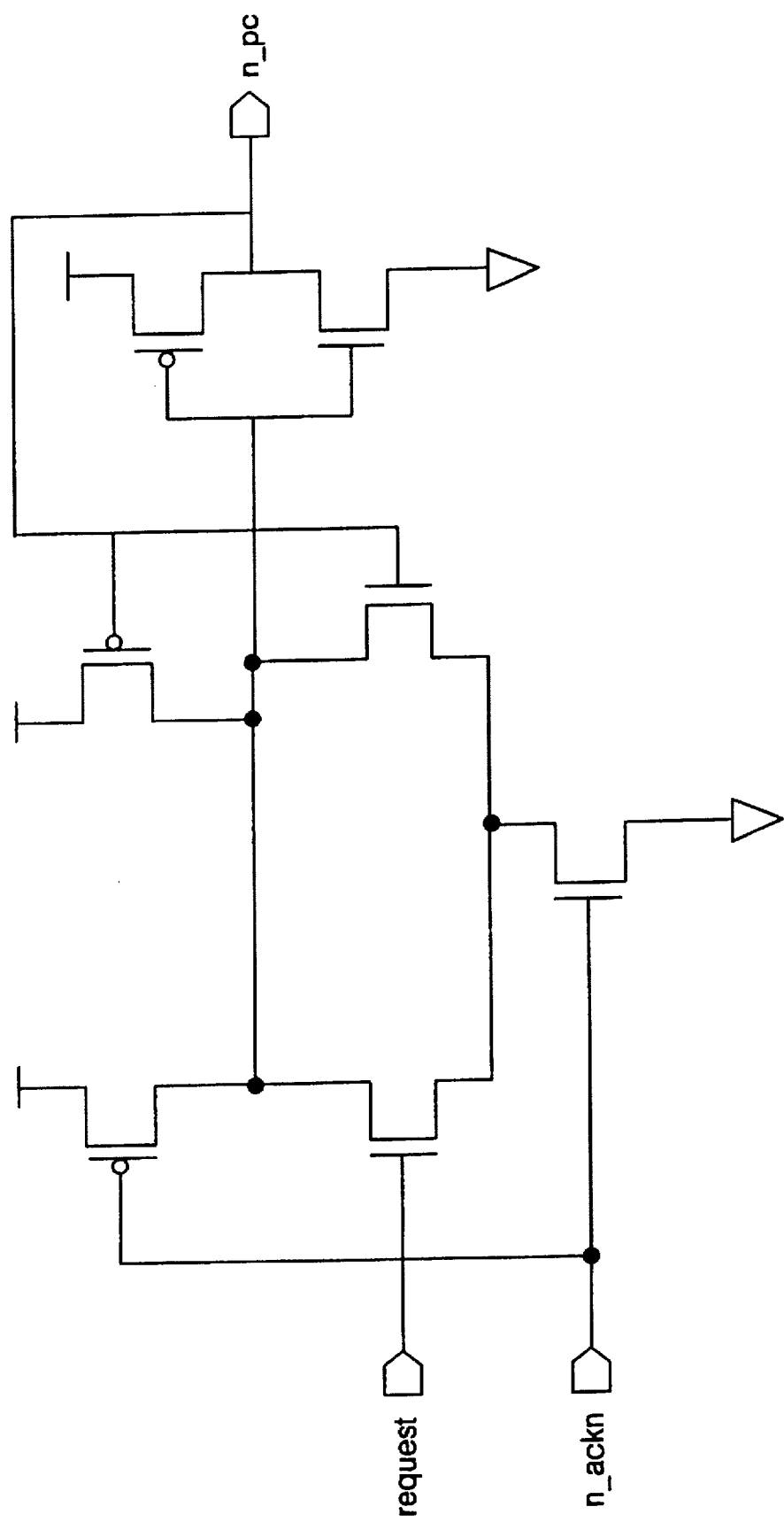
FIG. 2 illustrates a detailed circuit diagram of a dynamic control element.

FIG. 2 illustrates a circuit diagram of an embodiment of each DCE circuit in accordance with the present invention, and which embodies the truth table above.

Referring again to FIG. 1, initially, all circuits are assumed to have completed a precharge cycle (refer to the above-referenced United States patent applications) and acknowledge signals ackn__1 through ackn__3 are high. This is caused by the dual rail outputs of circuits 103, 112–119 being low. Consequently the outputs of all NOR gates (109–111) are high. It is also assumed that the request line is initially inactive (low) which places DCE circuits 106–108 into their standby condition, thus maintaining all logic circuits (101, 103, 112–119) in their precharge states. Use of a request signal is also discussed in U.S. patent application Ser. No. 08/517,043, which is hereby incorporated by reference herein. The request line may be connected to the clock signal of the CPU and the last logic stage and may also be reset by the clock if a synchronous interface is desired. For an asynchronous interface the request input would be received from a previous pipeline stage and the last stage would be reset in accordance with the self-timed protocol. The following description addresses the fully asynchronous interface.

Figure 3A:
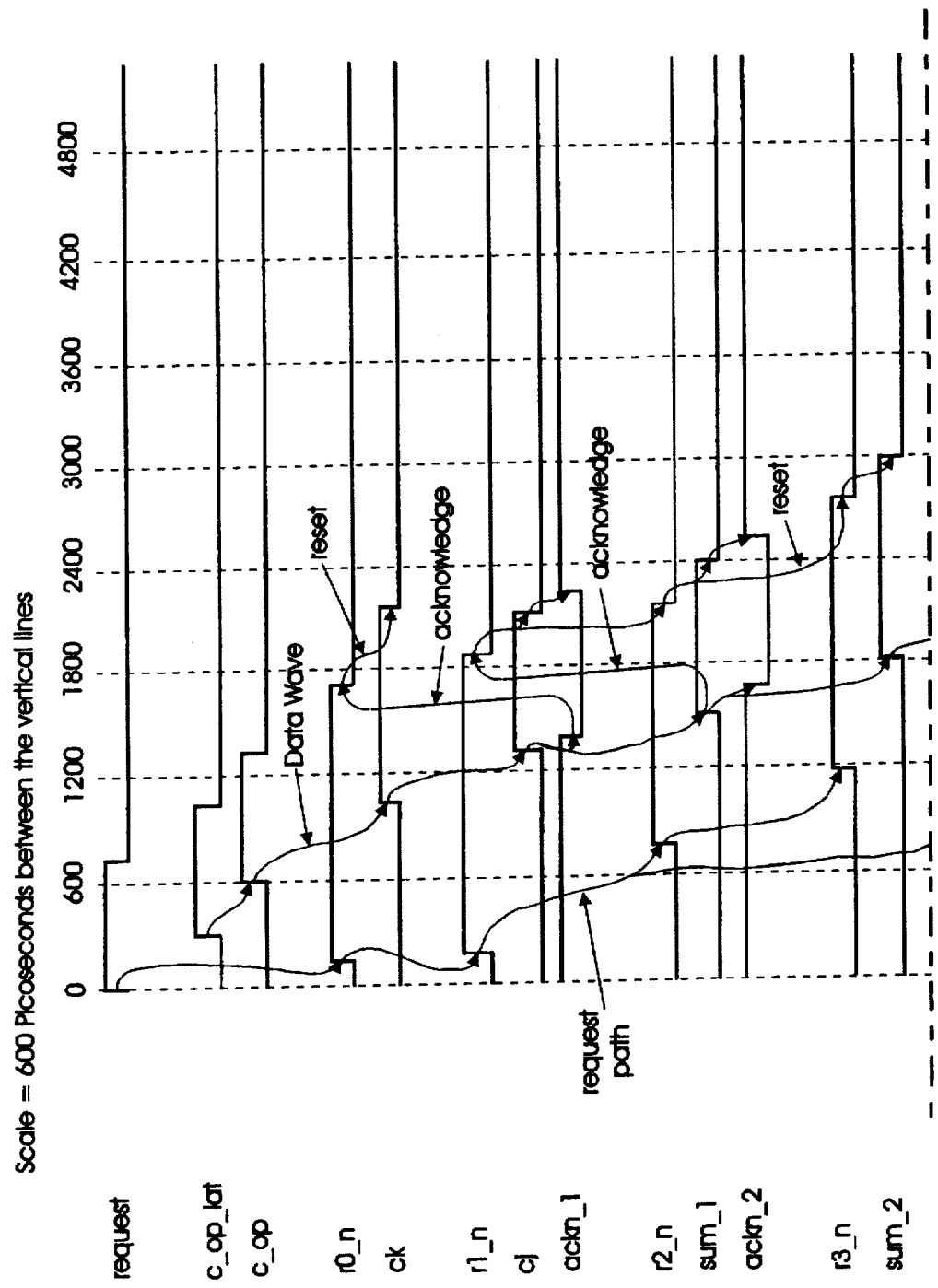
FIG. 3, shown as FIGS. 3A–3B, illustrates a timing diagram of an operation of the present invention.
Figures 3, 3B:
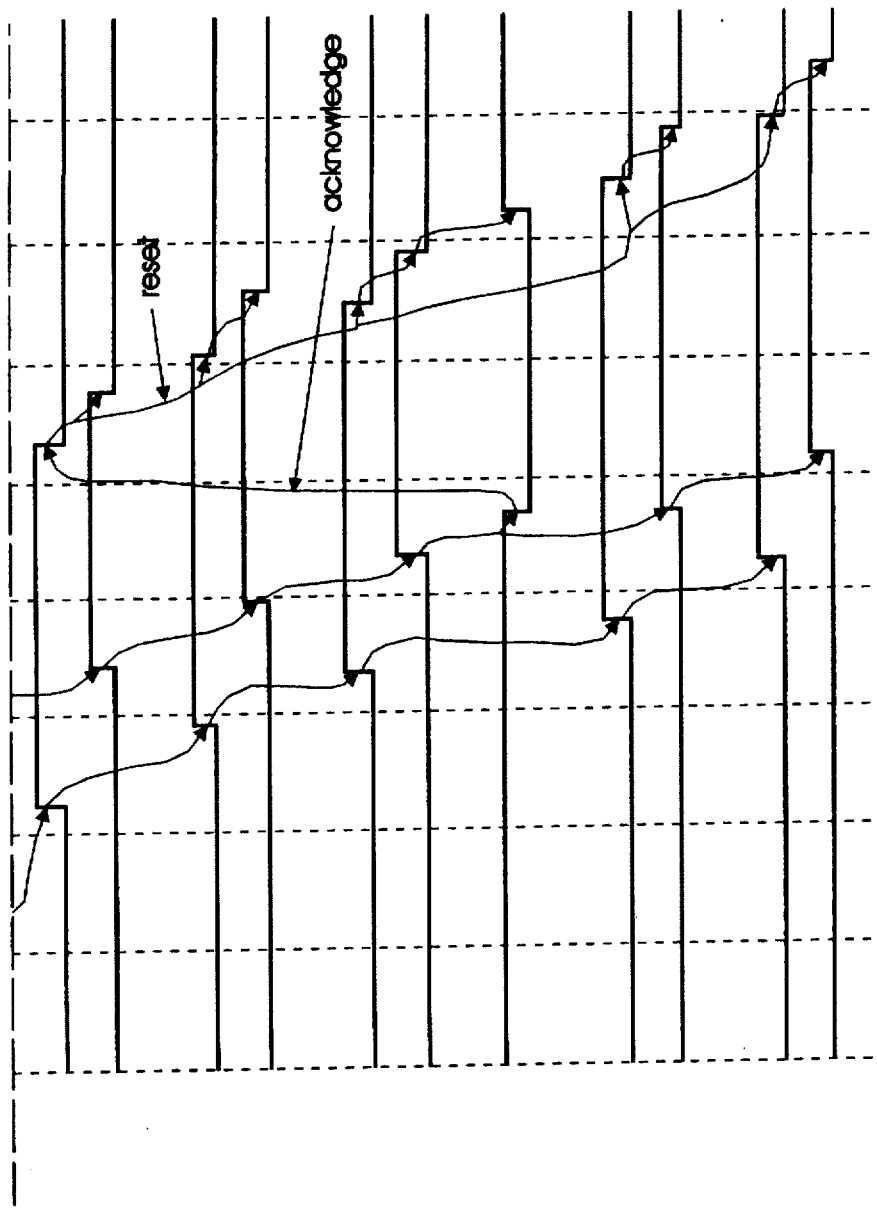

Referring next to FIG. 3, there is illustrated an arrow diagram of the timings giving the relationship of signals to each other in the operation of the present invention with respect to the multiplier array. All data lines are dual rail, but for simplicity only "true" data is shown in the timing diagrams.

The request signal is issued at time 0 picoseconds (ps) from the previous pipeline stage and DCE__1 106 evaluates, and signal r0_n goes high (150 ps). This takes bypass-mux 101 out of precharge and places it in a standby condition ready to receive and evaluate inputted data. Virtual ground devices in bypass-mux 101 allow the input data to the circuit to be active when the precharge signals are on and ensures proper interface to other macros. For this discussion it is assumed that data is issued at 300 ps and arrives at booth-recoder 102 and bypass-mux 101 delayed by RC (resistive and capacitive components of the interconnection) and drivers and receivers mux 300 ps later. For simplicity of discussion it is also assumed that the data to bypass-mux 101 and booth-recoder 102 arrive at the stone time, even though that is not a requirement. The control lines c_on and bp_on into bypass-mux 101 are available at the beginning of the request cycle, however, this is not a requirement for the pipeline to work properly.

Both bypass-mux 101 and booth-recoder 102 evaluate and bypass-mux 101 sends its data (ck/ck_n) to booth-mux 103 (450 ps after c_op/c_op_n active—including RC) and booth-recoder 102 asserts one control line in each set of five (booth-recoder 102 resets itself after 1.5 ns (nanoseconds)). Booth-mux 103, which was placed in standby by signal r1_n going high (150 ps after request going high, +20 ps extra for RC) now evaluates and one of its dual rail outputs (cj or cj_n) is raised to a logic one at ck/ck_n active +250 ps. This is detected by NOR_1 109 and ackn_1 goes low at cj/cj_n active +150 ps, which constitutes the acknowledge signal for DCE_1 106, and signal r0_n is forced low at ackn_1 low +250 ps, which puts bypass-mux 101 back into precharge, and the active output ck/ck_n input of bypass-mux 101 goes low 450 ps later. The ackn_1 signal is also connected to the circuitry (not shown)driving the multiplier array and by going low it signals to the driver associated with this circuitry that it is okay to inactivate the input data.

The previously generated high of signal r1_n is delayed 600 ps by buffer B_1 120, becomes signal r2_n and puts CSA_1 through CSA_3 112 into standby now awaiting cj/cj_n active data signals from BM_1 through 8 103. Signals sum_1/sum_1_n go active 250 ps after cj/cj_n goes active. Also signal ackn_2 goes low 150 ps after signals sum_1/sum_1_n go active setting signal r1_n low 60 1 ps later, forcing booth-muxes 103 into a precharge state and cj/cj_n goes inactive 250 ps delayed. This raises signal ackn_1 within 150 ps and DCE_1 106 is placed in standby mode. It also signals to the previous interface circuits (not shown) that the multiplier array is ready to receive new data.

Buffers 120–124 may be comprised of any well-known buffer circuitry.

The reset signal r2_n is fed to DCE_3 108, taking it out of precharge and 600 ps later putting CSA_6 into a standby condition. Furthermore, signal r2_n is delayed by 400 ps via buffer B_2 121 and signal r3_n is forced high, which in turn takes CSA_4 and CSA_5 113 out of precharge.

Dual rail signal sum_2/sum_2_n evaluates within 250 ps of dual-rail signal sum_1/sum_1_n going active. This causes CSA_6 114 to evaluate and dual-rail signal sum_3/sum_3_n becomes active 250 ps later. CSA_6 114 contains a virtual ground (vg) device, which allows it to shrink the pulse width of the wave front at this time by turning on the reset before the input data goes inactive. This may be needed to ensure cycle time compliance. The vg device location was chosen at this point, because the device sizes of CSA_6 114 are small, while CSA_7 115 has to drive long lines to interconnect with array portion 105.

The signal r4_n is passed through buffer B-3 122 (forward delay 400 ps) and signal r5_n takes CSA_7 115 out of precharge. AND gate 125 delays signal r5_n and CSA_Z1 116 and CSA_Z4 117 are placed in standby mode 250 ps later. AND gate 125's function is to also await requests from circuitry FJXJ and circuitry FJYJ before the wave front is permitted to continue to circuitry 105. Circuitry FJXJ and FJYJ (not shown) are similar to FJWJ 104 and operate in parallel with FJWJ 104. Each of FJWJ 104, FJXJ and FJYJ produce two partial products. Consequently CSA_Z1 116 and CSA_Z4 117 must also contain virtual ground devices, unless the interface is carefully tuned which would introduce some undesired hazards.

310 ps (this includes RC) after dual-rail signal sum_3/sum_3_n goes active, dual-rail signal sum_4/sum_4_n goes active and so does signal sum_5/sum_5_n 250 ps delayed. NOR_3 111 pulls down signal ackn_3 200 ps later, which resets DCE_3 108 and lowers signal r4_n 400 ps delayed. This places CSA_6 114 in precharge mode and inactivates dual-rail signal sum_3/sum_3_n. The r4_n signal is delayed 500 ps and additional 200 ps to pull down signals r5_n and r6_n, respectively. This has the effect that CSA_7 115, CSA_Z1 116 and CSA_Z4 117 are placed in precharge mode and their respective outputs go inactive 250 ps after their respective reset signals go low. Sum_5/sum_5_n going low is detected by NOR_3 111 and signal ackn_3 is pulled high 200 ps delayed, placing DCE_3 108 in standby mode to await another request from signal r2_n.

The r6_n signal going high is also delayed 250 ps by buffer B_5 123 and signal r7_n removes the precharge state from CSA_Z2 118. A further delay of 300 ps through buffer B_6 124 causes CSA_Z3 119 to be taken out of precharge. As the wave front arrives at the input of CSA_Z2 118 it evaluates and sum_6/sum_6_n goes active 250 ps later, causing CSA_Z3 119 to evaluate and sum_7/sum_7_n to go active 250 ps delayed. When signal r7_n goes low 600 ps after signal r6_n going low, the output of CSA_Z2 118 goes inactive 250 ps delayed. Likewise the output of CSA_Z3 119 goes inactive 250 ps delayed from signal r8_n going low, which is delayed from signal r7_n by 300 ps.

FIG. 3 illustrates the various relationships of the signals. Depicted are request, data, acknowledge and reset paths. It becomes particularly clear how the request leads the data wave.

The control signals of the pipeline may either be derived from actual logic circuits or from a dummy pipeline representing the logic circuits and may be placed in as many bit positions as deemed necessary. Furthermore, the concept of the self-timed approach may be extended to the complete data flow of the floating point unit or to any pipeline of logic circuitry.

Figure 4:
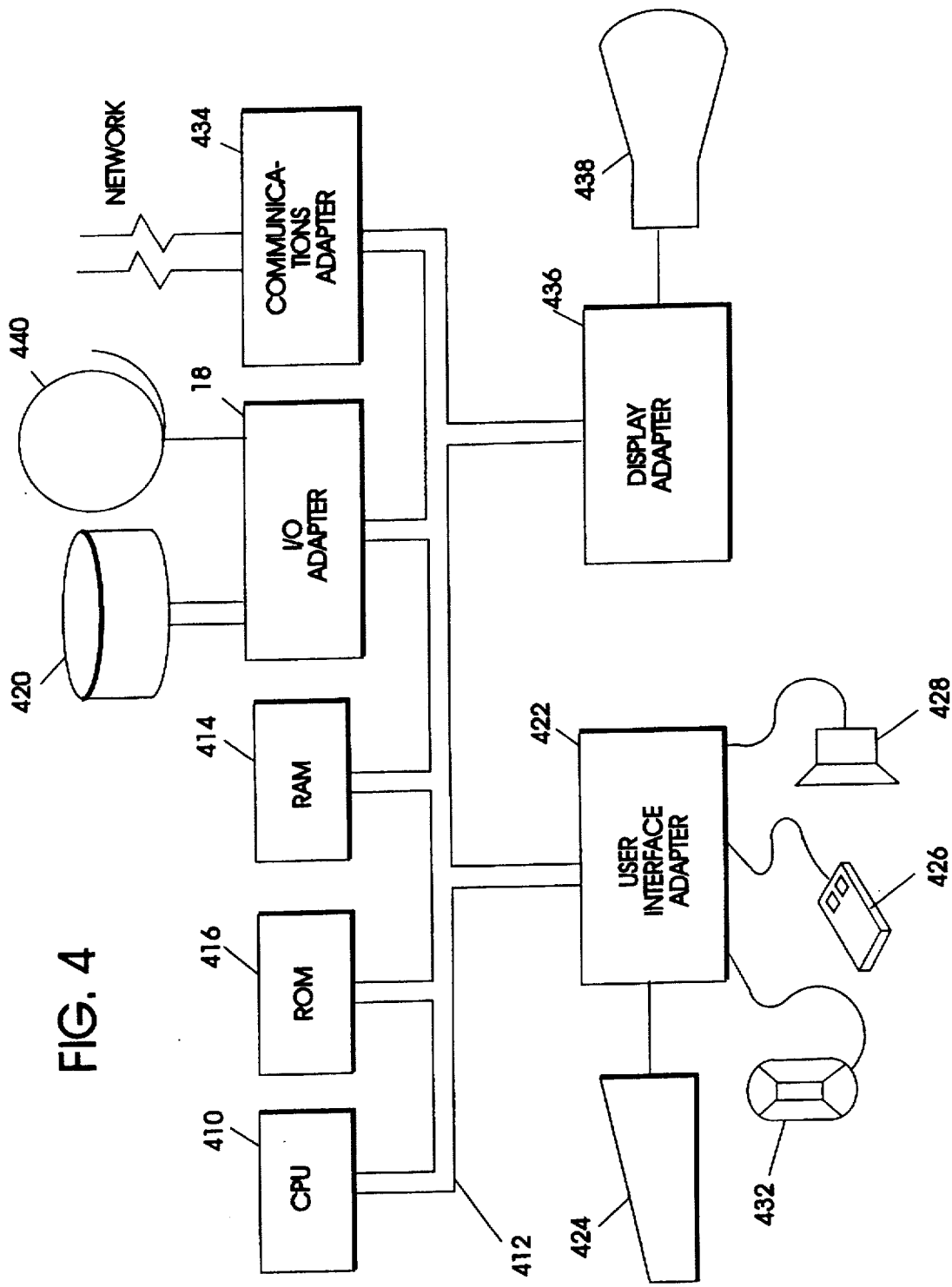
FIG. 4 illustrates a data processing system configured in accordance with the present invention.

A representative hardware environment for practicing the present invention is depicted in FIG. 4, which illustrates a typical hardware configuration of a workstation in accordance with the subject invention having central processing unit 410, such as a conventional microprocessor, and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for performing logic operations on data in a pipeline of logic circuitry, wherein said pipeline comprises a plurality of cascaded stages, wherein each of said plurality of stages includes logic circuitry, said method comprising the steps of:

receiving first data into a first stage of logic circuitry;

performing a logic operation on said first data with said first stage of logic circuitry to produce second data;

outputting said second data from said first stage of logic circuitry;

transferring said second data from said first stage to a second stage of logic circuitry;

monitoring said second data;

placing a third stage of logic circuitry into a standby state in response to said monitoring step;

receiving said second data at said second stage of logic circuitry;

performing a logic operation on said second data with said second stage of logic circuitry to produce third data;

outputting said third data from said second stage of logic circuitry;

transferring said third data from said second stage to said third stage of logic circuitry; and performing a logic operation on said third data with said third stage of logic circuitry.

2. The method as recited in claim 1, wherein said placing step further comprises the step of removing said third stage of logic circuitry from a precharge state, wherein said standby state is a state wherein said third stage of logic circuitry is ready to receive said third data and perform said logic operation on said third data with said third stage of logic circuitry.

3. The method as recited in claim 2, wherein said placing step is performed previous to said step of performing a logic operation on said second data with said second stage of logic circuitry to produce third data.

4. The method as recited in claim 2, further comprising the step of:

placing one or more stages of logic circuitry into said standby state in response to said monitoring step, wherein said one or more stages of logic circuitry are subsequent to said third stage of logic circuitry in their evaluation of said data in said pipeline.

5. The method as recited in claim 1, further comprising the steps of:

monitoring said third data; and resetting said second stage of logic circuitry in response to said step of monitoring said third data.

6. A data processing system comprising a processor coupled by a bus to a storage device, a memory device, an input device and an output device, said processor comprised of logic circuitry arranged in a pipeline of stages of logic circuitry operable for propagating data through said stages in a successive manner, said logic circuitry comprising:

means for receiving first data into a first stage of said logic circuitry;

means for performing a logic operation on said first data with said first stage of said logic circuitry to produce second data;

means for outputting said second data from said first stage of said logic circuitry;

means for transferring said second data from said first stage to a second stage of said logic circuitry;

means for monitoring an arrival of said first data;

means for placing a third stage of said logic circuitry into a standby state in response to said monitoring means;

means for receiving said second data at said second stage of said logic circuitry;

means for performing a logic operation on said second data with said second stage of said logic circuitry to produce third data;

means for outputting said third data from said second stage of said logic circuitry;

means for transferring said third data from said second stage to said third stage of said logic circuitry; and means for performing a logic operation on said third data with said third stage of said logic circuitry, wherein said placing means further comprises a means for removing said third stage of said logic circuitry from a precharge state, wherein said standby state is a state wherein said third stage of said logic circuitry is ready to receive said third data and perform said logic operation on said third data with said third stage of said logic circuitry, wherein said third stage of said logic circuitry is placed into a standby state previous to said second stage performing a logic operation on said second data to produce said third data.

7. The circuitry as recited in claim 6, further comprising:

means for monitoring said third data; and means for resetting said second stage of said logic circuitry in response to said means for monitoring said third data.

8. The circuitry as recited in claim 7, further comprising:

means for placing one or more stages of said logic circuitry into said standby state in response to said monitoring step, wherein said one or more stages of said logic circuitry are subsequent to said third stage of said logic circuitry in their evaluation of said data in said pipeline.

9. The circuitry as recited in claim 8, wherein said logic circuitry is included within a multiplier in said processor.

* * * * *

UNITED STATES PATENT AND TRADEMARK OFFICE
CERTIFICATE OF CORRECTION

PATENT NO. : 5,740,094
DATED : April 14, 1998
INVENTOR(S) : Peter J. Klim

It is certified that error appears in the above-indentified patent and that said Letters Patent is hereby corrected as shown below:

*Column 4, line 36, please insert the following: --$Q_{n-1}$ = previous state (standby state)--.

Signed and Sealed this

Second Day of February, 1999

Attest:

Attesting Officer

Acting Commissioner of Patents and Trademarks